March 6, 1951     C. R. FLINT     2,544,494
PISTON
Filed Feb. 8, 1950
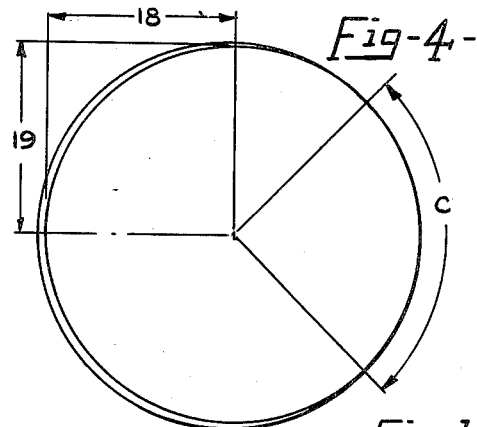
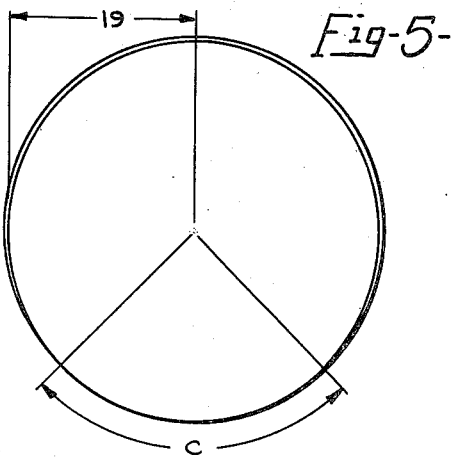
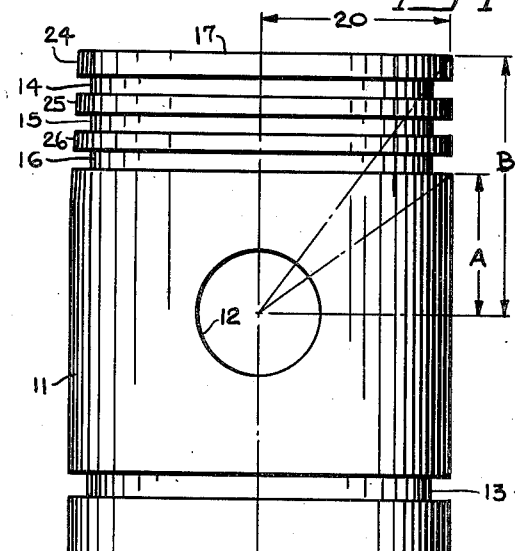
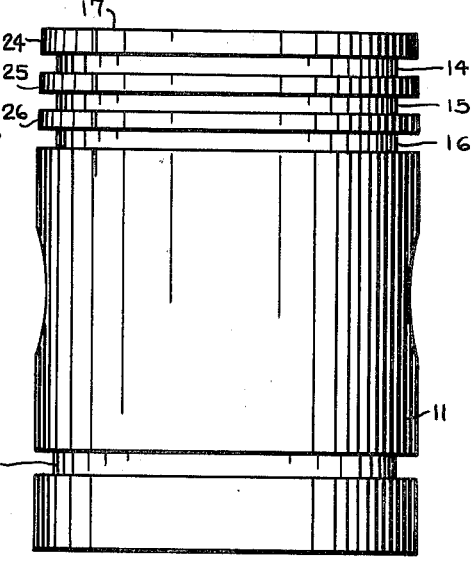
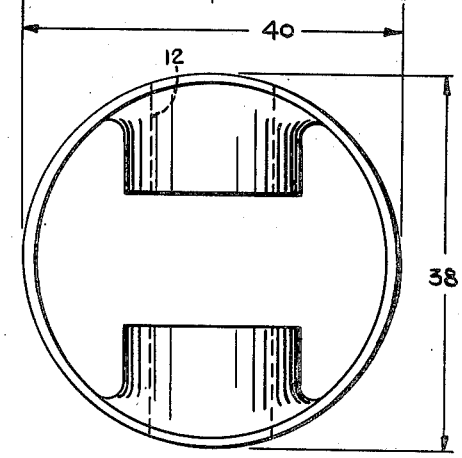
INVENTOR.
CHARLES R. FLINT
BY
*Edwin S. Hall*
ATTORNEY Patented Mar. 6, 1951

2,544,494

UNITED STATES PATENT OFFICE 2,544,494

PISTON

Charles R. Flint, La Porte, Ind.

Application February 8, 1950, Serial No. 143,112

3 Claims. (Cl. 309—9)

This invention relates to pistons for internal combustion engines, and has for its principal object the provision of an improved piston so constructed that it will transfer heat more rapidly to the cylinder walls and maintain itself more precisely in alignment with the cylinder.

Trunk pistons in internal combustion engines absorb heat from the combustion and must transfer that heat to the cylinder walls or to the oil which bathes the inside surfaces of the piston. The nearer the piston head, the hotter the piston metal. The usual practice is to taper the piston toward its head, making the top land above the upper ring smaller in diameter than the piston skirt to allow for expansion, the land above the second ring a little less smaller than the skirt, and so on. Relieving these lands tends to take them out of intimate contact with the cylinder wall and provides effective heat dams, forcing the heat to travel thru the rings to the cylinder wall or down to the piston skirt which fits more closely in the cylinder. The inside surfaces of the piston head may run so hot as to burn the oil, depositing carbon inside the piston and making the oil black and dirty. An object of this invention is to provide a piston construction which will transfer heat to the cylinder walls more rapidly and from the top lands of the piston, to get the heat out of the piston head at once, without forcing so much of it thru the rings or down into the piston skirt, permitting the skirt to be larger in diameter to fit the cylinder more closely, and allowing the inside of the piston head to be cool enough to avoid carbonizing the oil.

A trunk piston tends to expand in line with the piston pin bosses more than transversely thereto; the usual practice is to make the piston skirt slightly oval by cam-grinding, the diameter parallel to the piston pin a little less than the diameter transverse thereto. A trunk piston, because of connecting rod angularity, tends to cock or rock out of alignment with the cylinder—tends to develop piston slap. Ordinarily the stability of the piston relative to the cylinder is a function of the distance between the piston pin and the first piston ring above it, since the lands above the ring are relieved to allow for expansion. An object of this invention is to provide a piston so constructed that the stability of the piston relative to the cylinder may be a function of the distance between the piston pin and the piston head surface, thus permitting the designer to cut down the height of the engine while still achieving better piston stability. In other words, an object of this invention is to provide a piston that will maintain itself more precisely in alignment with the cylinder, thus insuring better piston ring action, the rings being maintained precisely square with the cylinder to avoid rounding their corners. (When the rings become rounded, instead of scraping the oil and forming an intimate seal and contact with the cylinder walls, they tend to ride up, like slippers, on a thicker oil film, whereupon they lose their effectiveness in sealing and in heat transfer.)

The pressure in the cylinder ordinarily leaks rapidly between the piston ring and the upper wall of the ring groove, and forces the ring outwardly against the cylinder wall. An object of this invention is to provide an improved piston which will reduce the development (in the fraction of a second available) of intense pressure of the piston rings against the cylinder walls, and thus reduce piston ring friction and wear.

Another object of this invention is to provide an improved piston without additional cost in manufacture.

Briefly described, the invention consists in providing less relief for expansion for the entire piston, more especially in relieving the top lands for only about three-quarters of their circumference, leaving the quadrant on the side of the piston which takes the torque reaction from connecting-rod angularity, without any relief at all, this local segment of the piston being left in cylindrical form as when first machined or cam-ground to size.

The invention and its objects may be more readily understood from the following description in connection with the drawings in which:

Fig. 1 is an elevation of the piston taken in line with the piston pin;

Fig. 2 is an elevation of the piston, transversely to the piston pin;

Fig. 3 is a bottom view of the piston;

Fig. 4 is a top view of the piston; and

Fig. 5 is another top view of the piston.

*Note.*—The reliefs for expansion of the piston are greatly exaggerated in the drawings, to aid in the description. One skilled in the art knows that these reliefs by cam-grinding and tapering are actually no more than the thickness of a line on the drawings.

Referring to the drawings, the piston comprises a skirt portion 11 thru which the hole 12 is reamed for the piston pin. Skirt 11 may or may not have a lower ring groove 13. The piston is shown with three upper ring grooves, 14, 15, and 16, the usual number. The lands above these rings are designated 24, 25, and 26 respectively.

When first machined to size, the basic diameter of the piston is indicated by dimension 40 as shown in Fig. 3; its radius being dimension 20 as indicated in Fig. 1. After cam-grinding the entire piston, its minor diameter (parallel to the piston pin hole) is somewhat less, as indicated by dimension 38. In accordance with this invention, the side of the piston which is to take the thrust is left as originally machined or cam-ground for substantially the quadrant indicated at C, and the relief for expansion of lands 24, 25, and 26 is limited to the other three quadrants in any convenient manner, as indicated by radii 18 and 19 as compared with radius 20.

In operation, this improved piston is maintained, by connecting-rod angularity, with its straight quadrant in intimate contact with the cylinder wall. Land 24, at the very piston head 17 can easily transfer its heat to the cylinder; lands 25 and 26 can share in transferring heat, draining the heat from piston head 17 so rapidly as to prevent carbonization of the oil inside the piston, and preventing so much heat from traveling down into the skirt so that skirt 11 can be fitted more closely in the cylinder.

The stability of this improved piston is greatly improved. With its straight quadrant in intimate contact with the cylinder wall, piston alignment is dependent upon dimension B rather than on dimension A as it would be if lands 24, 25, and 26 were concentrically tapered as usual. Without losing piston stability, it would be obviously possible to reduce the distance from the piston pin hole to the lower ring materially, and thus permit the designer to reduce the height of the engine. This improved piston, with its straight quadrant keeping it parallel with the cylinder wall, cannot rock or cock, will run many more miles without piston slap, keeps the piston rings square with the cylinder walls, and postpones oil pumping.

With this improved piston, a quadrant of the top land 24 is so truly coacting with the cylinder wall as to prevent leakage of pressure behind the top ring for the extent of this quadrant, delaying the build-up of pressure behind the ring in the fraction of a second available, to reduce the total pressure and reduce piston ring friction and wear.

Having thus described the invention, it is obvious that the objects as stated have all been attained. While a specific construction has been shown and described, it is understood that changes may be made in detail without departing from the spirit or scope of the invention as set forth in the following claims.

I claim:
1. A trunk piston for an internal combustion engine having a piston head and piston side-walls, the elements of substantially one quadrant of said side-walls being truly straight and parallel to the axis of said piston, the other three quadrants of said side-walls being relieved for expansion as usual.

2. A trunk piston for an internal combustion engine, having a piston head, piston ring grooves, and side-walls comprising lands above and between said grooves and a skirt below said grooves; said side-walls cam-ground from end to end to make the piston oval, said lands relieved for expansion for about three-quarters of their circumference, with no relief on the remaining circumferential quadrant of said lands.

3. A trunk piston for an internal combustion engine, having a piston head, piston ring grooves, side-walls comprising lands above and between said grooves and a skirt below said grooves, and a piston-pin hole; said side-walls cam-ground from end to end to make the piston oval with its diameter parallel to said piston-pin hole slightly less than its diameter transverse thereto, said lands relieved for expansion for only about three-quarters of their circumference, with no relief on the remaining circumferential quadrant of said lands, this remaining quadrant having the elements of its surface truly straight and parallel with the axis of said piston.

CHARLES R. FLINT.

REFERENCES CITED

The following references are of record in the file of this patent:

UNITED STATES PATENTS

| Number | Name | Date |
|---|---|---|
| 1,758,444 | Jehle et al. | May 13, 1930 |
| 1,908,718 | Williams | May 16, 1933 |
| 1,927,611 | Moore | Sept. 19, 1933 |
| 2,130,923 | Jardine | Sept. 20, 1938 |

FOREIGN PATENTS

| Number | Country | Date |
|---|---|---|
| 445,669 | Great Britain | Apr. 16, 1936 |